(No Model.)  2 Sheets—Sheet 1.
M. REW.
SIDE DELIVERY HAY RAKE.
No. 410,608.  Patented Sept. 10, 1889.
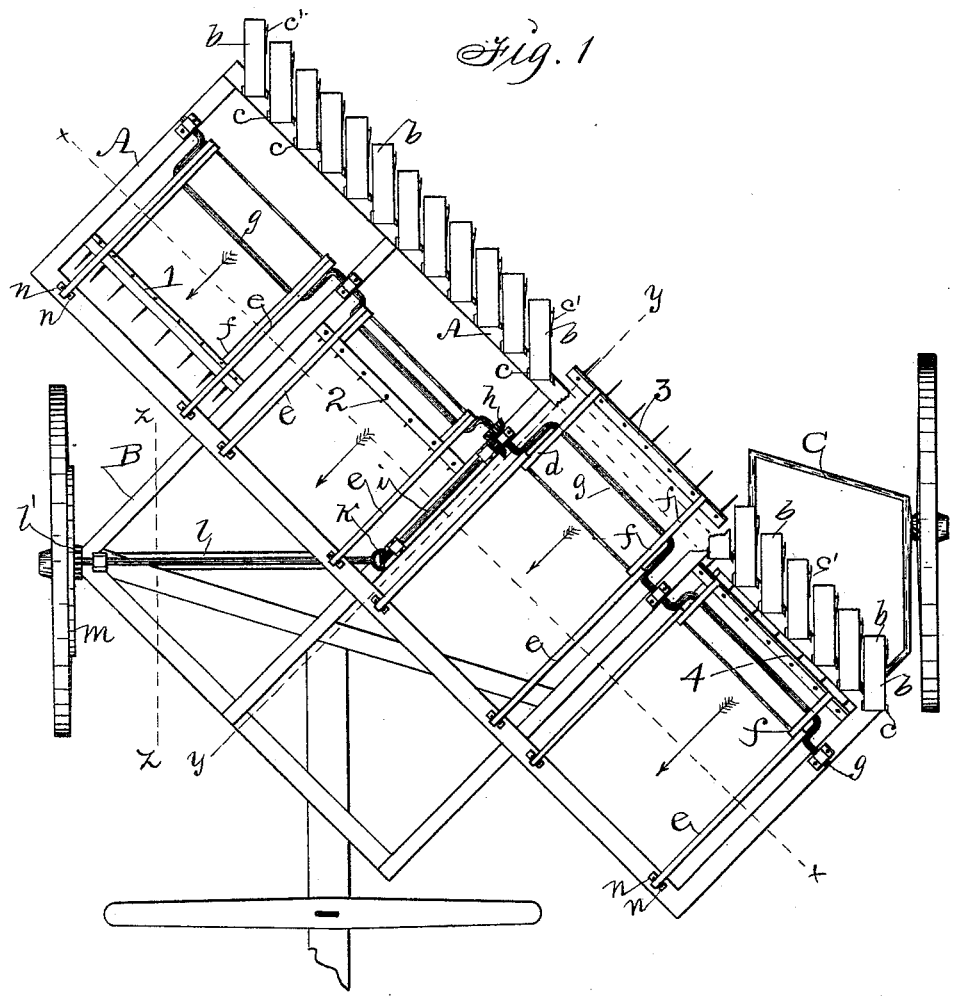

(No Model.) 2 Sheets—Sheet 2.
M. REW.
SIDE DELIVERY HAY RAKE.
No. 410,608. Patented Sept. 10, 1889.
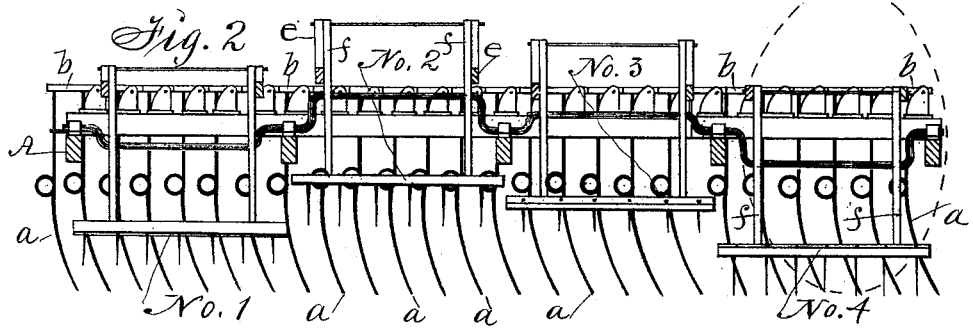
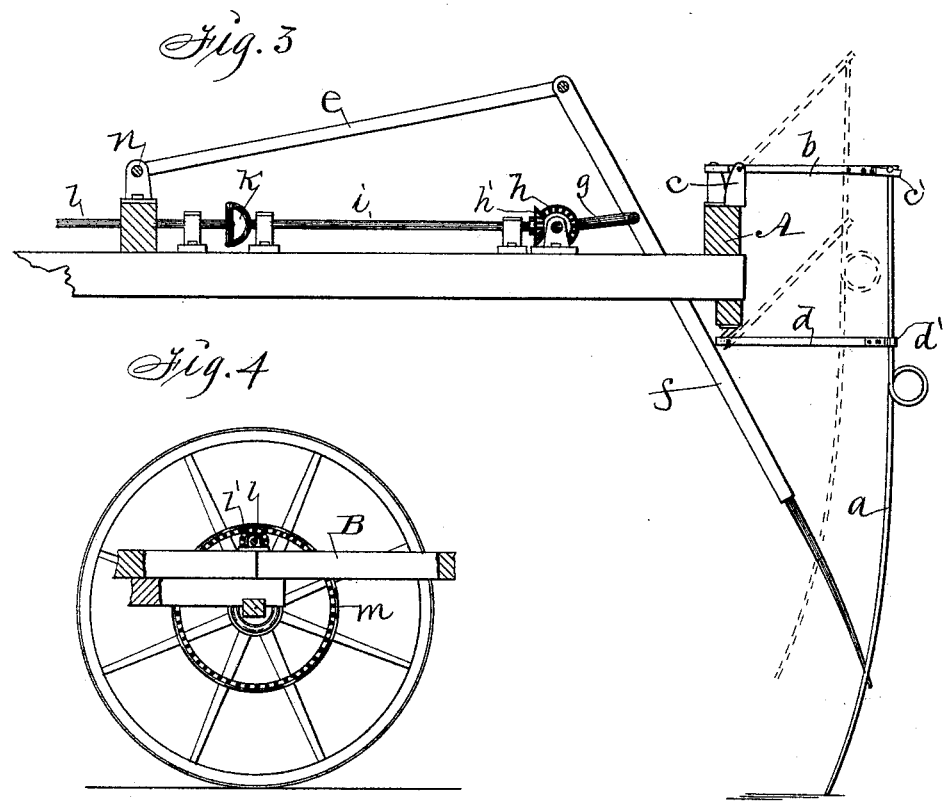
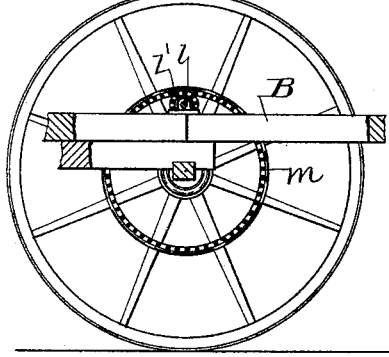
Witnesses:
G. W. Sues.
M. P. Smith.
Inventor:
Madison Rew,
By Thomas G. Orwig, Atty.

UNITED STATES PATENT OFFICE.

MADISON REW, OF GRINNELL, IOWA.

SIDE-DELIVERY HAY-RAKE.

SPECIFICATION forming part of Letters Patent No. 410,608, dated September 10, 1889.

Application filed March 11, 1889. Serial No. 302,852. (No model.)

*To all whom it may concern:*

Be it known that I, MADISON REW, a citizen of the United States of America, and a resident of Grinnell, in the county of Poweshiek and State of Iowa, have invented a Side-Delivery Hay-Rake, of which the following is a specification.

My object is to provide a machine adapted to gather hay in the field and deposit it in a windrow extending along the side of the line of advance, as hereinafter set forth, pointed out in the claim, and illustrated in the accompanying drawings, in which—

Figure 1 represents a top view of a hay-rake embodying my invention, with the rake-head partly broken away, so as to show the maximum reach of one of the forks. Fig. 2 is a longitudinal section on the line $x\ x$ of Fig. 1, showing the position of the left-hand wheel by a dotted line. Fig. 3 is an enlarged detail view between lines $y\ y$ of Fig. 1, showing the position of the miter-wheels; while Fig. 4 is a sectional view on the line $z\ z$ of Fig. 1, illustrating the spur-wheel and pinion-connection to the drive-wheel.

A represents a rectangular rake-frame that is provided with two supporting-wheels, which are connected to said frame by means of the auxiliary frame B and support C, and hold the main frame at an angle of about forty-five degrees to the line of the axles. The auxiliary frame B, which forms part of the main frame, acts as a support for the stub-axle of the right-hand traction and driving wheels, and at the same time gives support to the tongue. The support C, which is bolted to the rear portion of the rake-frame, is preferably made of wrought-iron, and is provided with a spindle, upon which is the left-hand wheel, as shown in Fig. 1.

At the rear portion the rake-frame is provided with a series of vertically-yielding rake-teeth, marked $a$. Their upper ends are bent at right angles, and thereby adapted to work within openings in the pivoted arms $b$, as shown in Fig. 3. The arms $b$ are pivotally connected to the rake-head by means of duplex bearers $c$, that hold them in a raking position, approximately at an angle of forty-five degrees. The teeth are movably held within the end opening of the arms $b$ by means of a strap $c'$, or in any suitable way.

At a suitable distance from each arm $b$, which is preferably made of wood, a rod $d$ is pivotally connected to the tooth by means of a clip $d'$. At the front end this rod is connected to the under side of the rake-head by means of a suitable hook, and being at an angle approximately coinciding with that of the arm $b$ it readily permits a vertical motion of the tooth, as indicated by the dotted lines in Fig. 3. The teeth are curved and readily adapt themselves to any irregularities of the surface, and, being arranged and working independently, each tooth may yield to obstructions without affecting the operation of the other teeth.

Working transversely and connected to the rake-frame A by means of suitable pivot-arms $e$, pitmen $f$, and the journaled crank-shaft $g$, are a series of reciprocating throwing-forks, marked 1, 2, 3, and 4. The crank-shaft $g$, by means of which the throwing-forks are actuated, is provided with a series of cranks alternately placed at right or equal angles to one another, and is held upon the rake-frame by means of suitable bearings, each of said cranks being engaged by a set of pitmen $f f$, as illustrated.

Centrally the shaft is provided with the miter-gear $h$, which is adapted to mesh with the corresponding miter $h'$ of the shaft $i$. This shaft is connected by means of a universal joint $k$ to the pinion-shaft $l$, the pinion $l'$ of which engages the internal gear-wheel $m$, which is fixed to the driving-wheel from which the power is derived.

The forks have an orbital movement and play close to the teeth of the rake, and are adapted to strike the collected hay, one at a time in alternating order, and sweep the hay obliquely forward and laterally to the line of advance. The forks are provided with curved tines of a suitable length, and are connected by means of the fork-head to the lower ends of the fork-holders $f f$. At a suitable distance from the end the fork-holders are journaled to the crank-shaft $g$, while the upper ends are connected to the pivoted arms $e\ e$, which in turn are pivotally connected to the forward brace of the rake-frame by means of the fixed irons $n\ n$, as illustrated in Fig. 3.

The operation of the rake is as follows:

Each one of the forks, which reciprocate in alternating order, clears a certain number of rake-teeth and sweeps the collected load into the path of the following fork until the last fork in the series is reached, which delivers the hay at an angle to the line of advance in a continuous windrow.

Having thus described my said invention, what I claim as new, and desire to secure by Letters Patent, is—

A machine for gathering hay and placing it in a row parallel with its line of advance, comprising an oblong frame having a pole extending forward from its front side at an acute angle to the frame, supporting traction-wheels at the opposite sides and end portions of the frame and in parallel position with the pole, a series of rake-teeth independently connected with the rear side of the frame, a rotating shaft having bends or cranks extending in different planes in bearings attached to the cross-pieces of the frame in front of the rake-teeth, forks pivoted to the cranks of the shaft, to swing at right angles to the line of rake-teeth to move hay laterally to the line of advance, and a driver-wheel fixed to one of the traction-wheels and connected with the rotating crank-axle by means of shafts and bevel-gears arranged and combined substantially as shown and described, to operate in the manner set forth.

MADISON REW.

Witnesses:
M. SNYDER,
SPENCER PHILLIPS.